United States Patent
Morishita et al.

(10) Patent No.: US 10,024,476 B2
(45) Date of Patent: Jul. 17, 2018

(54) AIR CONDITIONING APPARATUS AND AIR CONDITIONING METHOD

(71) Applicant: Fuji Jukogyo Kabushiki Kaisha, Tokyo (JP)

(72) Inventors: Hideaki Morishita, Tokyo (JP); Kentaro Kamei, Tokyo (JP); Kenji Furuse, Tokyo (JP); Masahiko Ikeo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 1157 days.

(21) Appl. No.: 13/665,180

(22) Filed: Oct. 31, 2012

(65) Prior Publication Data

US 2013/0104995 A1    May 2, 2013

(30) Foreign Application Priority Data

Nov. 1, 2011  (JP) ................. 2011-240161

(51) Int. Cl.
*B60H 1/32*    (2006.01)
*F16L 53/00*   (2018.01)
*F16L 53/30*   (2018.01)

(52) U.S. Cl.
CPC .............. *F16L 53/001* (2013.01); *B60H 1/32* (2013.01); *F16L 53/30* (2018.01); *Y10T 137/0318* (2015.04); *Y10T 137/6416* (2015.04)

(58) Field of Classification Search
CPC ...... B60H 1/32; B60H 1/3204; B60H 1/3208; B60H 2001/32095; Y10T 137/6914; Y10T 137/0318; Y10T 137/6416

USPC .......................................................... 454/69
See application file for complete search history.

(56) References Cited

U.S. PATENT DOCUMENTS

| | | | | |
|---|---|---|---|---|
| 3,401,619 A | * | 9/1968 | Sotory | B60H 3/00 454/70 |
| 3,461,789 A | * | 8/1969 | Texidor | B60H 3/0007 454/70 |
| 3,680,467 A | * | 8/1972 | Brock | B60H 1/00464 454/136 |

(Continued)

FOREIGN PATENT DOCUMENTS

| JP | H03-123775 | 12/1991 |
|---|---|---|
| JP | 2004-122847 | 4/2004 |

(Continued)

OTHER PUBLICATIONS

Cho, j.h. et al, Air conditiong sdystem of Automobile; KR-2010 097968A, Espacenet patent search, European Patent Office.*

*Primary Examiner* — Steven B McAllister
*Assistant Examiner* — Frances F Hamilton
(74) *Attorney, Agent, or Firm* — Smith, Gambrell & Russell, LLP

(57) ABSTRACT

An air conditioning apparatus and an air conditioning method for cooling a passenger space of a vehicle that accommodates a user include a tank that is capable of storing compressed air, and a control unit to release the compressed air stored in the tank into the passenger space. Energy that is generated without putting a workload on the power source or electric power of the vehicle is used for at least one process of compressing air in the tank, cooling the compressed air stored in the tank, and heating the compressed air stored in the tank.

13 Claims, 8 Drawing Sheets

(56) References Cited

U.S. PATENT DOCUMENTS

| | | | | |
|---|---|---|---|---|
| 3,958,900 | A * | 5/1976 | Ueno | F01L 13/06 123/198 F |
| 4,798,053 | A * | 1/1989 | Chang | B60K 6/12 180/165 |
| 4,989,499 | A | 2/1991 | Scoccia et al. | |
| 5,038,576 | A * | 8/1991 | Hwang | B60H 1/3202 62/244 |
| 5,528,900 | A * | 6/1996 | Prasad | B60H 1/2215 62/175 |
| 5,955,940 | A | 9/1999 | Chen | |
| 7,886,552 | B2 | 2/2011 | Wang et al. | |
| 8,657,046 | B2 * | 2/2014 | Caudill | B60K 6/00 180/302 |
| 9,074,588 | B2 * | 7/2015 | Khajepour | F04B 27/067 |
| 2004/0031634 | A1 * | 2/2004 | Ching | B60K 6/12 180/165 |
| 2005/0282485 | A1 * | 12/2005 | Kato | B60H 1/243 454/136 |
| 2007/0285218 | A1 | 12/2007 | Fletcher et al. | |
| 2008/0296939 | A1 * | 12/2008 | Bajic | B60H 1/00285 297/180.1 |
| 2009/0288902 | A1 * | 11/2009 | Adli | B60K 3/00 180/302 |
| 2013/0084789 | A1 * | 4/2013 | Morishita | B60H 1/3204 454/70 |
| 2013/0084790 | A1 * | 4/2013 | Furuse | B60H 1/3204 454/75 |
| 2015/0112493 | A1 | 4/2015 | Haggerty | |

FOREIGN PATENT DOCUMENTS

| | | |
|---|---|---|
| JP | 2005-238911 | 9/2005 |
| JP | 2006-168476 | 6/2006 |
| JP | 2007-076546 | 3/2007 |
| JP | 2007-168466 | 7/2007 |
| JP | 2007-297965 | 11/2007 |
| JP | 2008-183996 | 8/2008 |
| JP | 2008-296901 | 12/2008 |
| JP | 2010-184579 | 8/2010 |
| JP | 2010-216739 | 9/2010 |
| KR | 1020070059347 | 6/2007 |
| KR | 20100097968 A * | 9/2010 |

* cited by examiner

AIR CONDITIONING APPARATUS AND AIR CONDITIONING METHOD

CROSS-REFERENCE TO RELATED APPLICATIONS

The present application claims priority from Japanese Patent Application No. 2011-240161, filed on Nov. 1, 2011, the entire contents of which are incorporated herein by reference.

BACKGROUND OF THE INVENTION

1. Field of the Invention

The present invention relates to a vehicle, an air conditioning apparatus, and an air conditioning method, which cool passenger space of a vehicle such as an automobile or the like.

2. Description of the Related Art

A vehicle such as an automobile or the like commonly has an air conditioning apparatus which starts a cooling operation to cool the passenger space thereof, when a user gets in the vehicle and starts its engine by operating an ignition key.

With such an existing air conditioning apparatus, a cooling cycle is started when a user gets in the vehicle and operates the ignition key to start the engine. Accordingly, time delay occurs until the passenger space is actually cooled. Therefore, in a situation where, for example, a vehicle is parked under the burning sun, its passenger space is heated, and thus a user has to endure the hot passenger space until the passenger space is cooled.

In order to solve such an existing problem, Japanese Unexamined Patent Application Publication (JP-A) Nos. 2006-168476, 2010-216739; 2008-296901, 2007-168466, 2008-183996, and 2005-238911 have disclosed techniques for releasing the compressed air into passenger space. In addition, JP-A No. 2007-297965 has disclosed a power generation and air cooling system taking advantage of pressure and heat of emission gas.

With a mechanism for releasing such compressed air into passenger space, there are conditions to be considered regarding energy used to compress air.

SUMMARY OF THE INVENTION

The present invention has been made in the light of such a situation, and aims to provide a cooling apparatus that is capable of performing suitable storing and releasing of the compressed air.

A first aspect of the present invention provides a vehicle including: passenger space that accommodates a user; a tank that is capable of storing compressed air; and a control unit to release the compressed air stored in the tank into the passenger space; wherein energy that is generated without putting a workload on the power source or electric power of the vehicle is used for at least one process of compressing air in the tank, cooling the compressed air stored in the tank, and heating the compressed air stored in the tank.

Preferably, compressed air stored in the tank may be compressed by one of rotational force transmitted from wheels during a deceleration period of the vehicle, discharge pressure of air brakes, and a compression device operated by air brakes.

Preferably, compressed air stored in the tank may be cooled by one of air taken into the vehicle or cooled, breeze from running, coolant of an air conditioning apparatus, coolant generated using driving force of at least one of an engine and a transmission of the vehicle, and coolant obtained by electric power from at least one of a battery and generator.

Preferably, compressed air stored in the tank may be heated by one of air taken into the vehicle or heated, heat from the vehicle body, a heat carrier of an air conditioning apparatus, a heat carrier generated using driving force of at least one of an engine and a transmission of the vehicle, a heat carrier obtained by electric power of at least one of a battery and generator, at least one of engine heat and exhaust heat, and heat from at least one of brakes and the transmission.

Preferably, air may be compressed in the tank by rotational force transmitted from wheels during a deceleration period of the vehicle, with the compressed air stored in the tank being cooled by air taken into the vehicle or cooled in the event of cooling compressed air stored in the tank, and the compressed air stored in the tank being heated by at least one of engine heat and exhaust heat in the event of heating compressed air stored in the tank.

A second aspect of the present invention provides an air conditioning apparatus for cooling a passenger space of a vehicle that accommodates a user. The air conditioning apparatus includes: a tank that is capable of storing compressed air; and a control unit to release the compressed air stored in the tank into the passenger space; with energy that is generated without putting a workload on the power source or electric power of the vehicle being used for at least one process of compressing air in the tank, cooling the compressed air stored in the tank, and heating the compressed air stored in the tank.

A third aspect of the present invention provides an air conditioning method of an air conditioning apparatus for cooling a passenger space of a vehicle that accommodates a user. The method includes the steps of: storing compressed air in the tank using energy that is generated without putting a workload on the power source or electric power of the vehicle; and discharging compressed air stored in the tank into the passenger space.

A fourth aspect of the present invention provides an air conditioning method of an air conditioning apparatus for cooling a passenger space of a vehicle that accommodates a user. The method includes the steps of: storing compressed air in the tank; performing one of cooling and heating compressed air stored in the tank, using energy that is generated without putting a workload on the power source or electric power of the vehicle; and discharging compressed air stored in the tank into the passenger space.

With the present invention, the compressed air stored in a tank is discharged into passenger space. The passenger space is cooled by the compressed air released into the passenger space. As a result thereof, with the present invention, the vehicle interior can immediately be cooled.

DESCRIPTION OF THE PREFERRED EMBODIMENTS

First Embodiment

Figure 1:
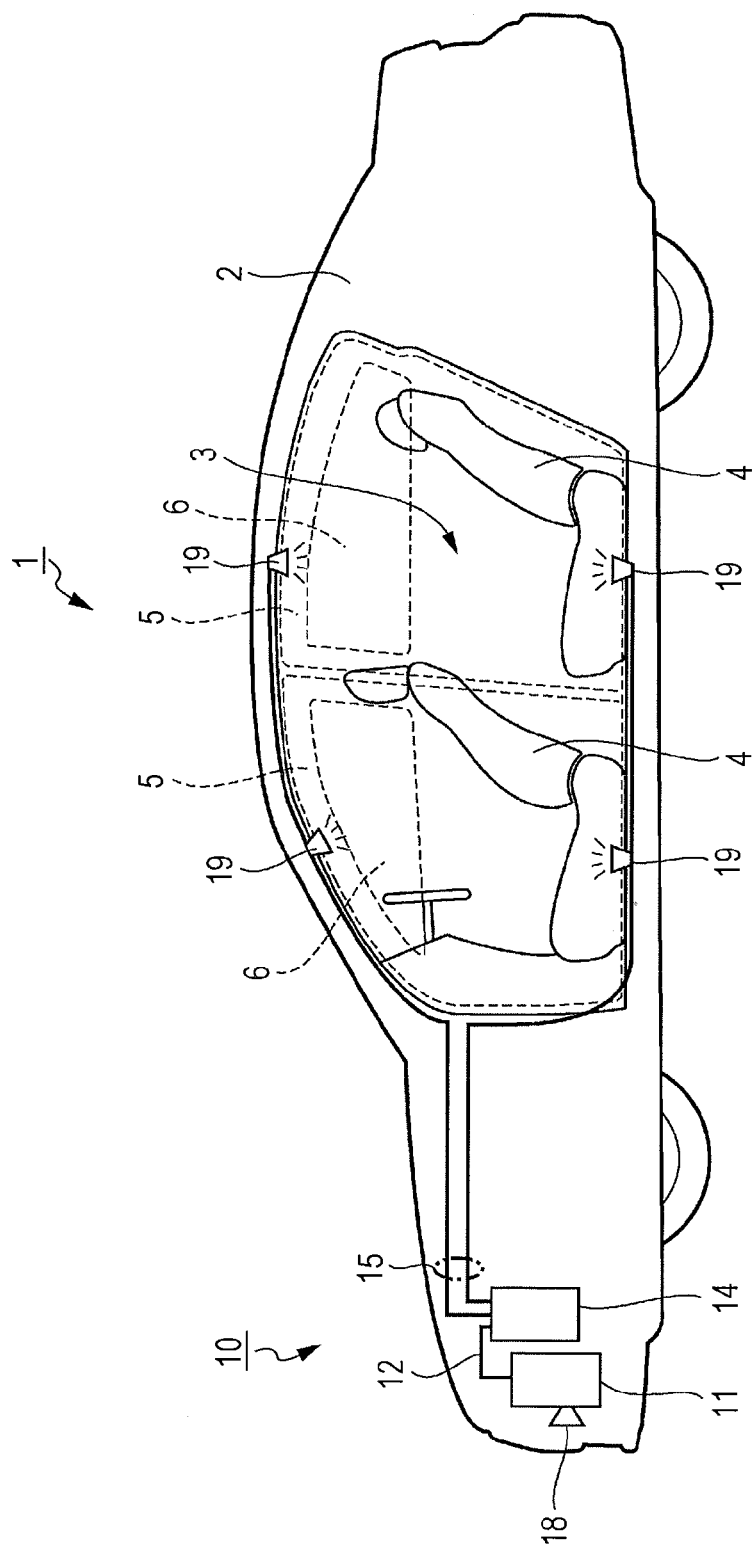
FIG. 1 is a partial transparent side view of the vehicle body of an automobile employing an air conditioning apparatus according to a first embodiment of the present invention.

FIG. 1 is a partial transparent side view of the vehicle body of an automobile 1 employing an air conditioning apparatus according to a first embodiment of the present invention.

The automobile 1 in FIG. 1 includes a vehicle body 2. The central portion of the vehicle body 2 includes passenger space 3 that accommodates a user. Two rows of seats 4 where a user sits down are provided within the passenger space 3. A door panel 5 which the user opens/closes for boarding is provided to the side face of the passenger space 3 of the vehicle body 2. A window glass 6 is provided on the upper portion of the door panel 5 in a vertically movable manner. The user can sit in the seat 4 by opening/closing the door panel 5. The user can open/close the window glass 6 by operating an opening/closing switch provided in the inner side of the door panel 5.

The passenger space 3 becomes, in a state in which the door panel 5 and window glass 6 are closed, space isolated from the outside. With such a passenger space 3, room temperature significantly increases, for example, due to hot solar radiation in the summer or the like. Also, surface temperature of interior equipment such as the seats 4 and so forth also increases, and accordingly, as for the user, the passenger space 3 has to rapidly be cooled.

With the common automobile 1, the user who has got into the vehicle operates an ignition key to start the engine, to activate an air conditioning apparatus, and to drive a compressor along therewith, and accordingly, a cooling cycle of the air conditioning apparatus is activated, and thus the air in the passenger space 3 is cooled.

However, in the event of cooling the passenger space 3 using the air conditioning apparatus in this way, the air in the passenger space 3 is directly cooled using heat-exchange equipment, and accordingly, it takes time until the passenger space 3 is cooled after the user's boarding. Therefore, with the present embodiment, a rapid air conditioning apparatus 10 is employed that rapidly cools the passenger space by releasing the compressed air into the passenger space before a user who intends to get into the vehicle gets into the vehicle.

Figure 2:
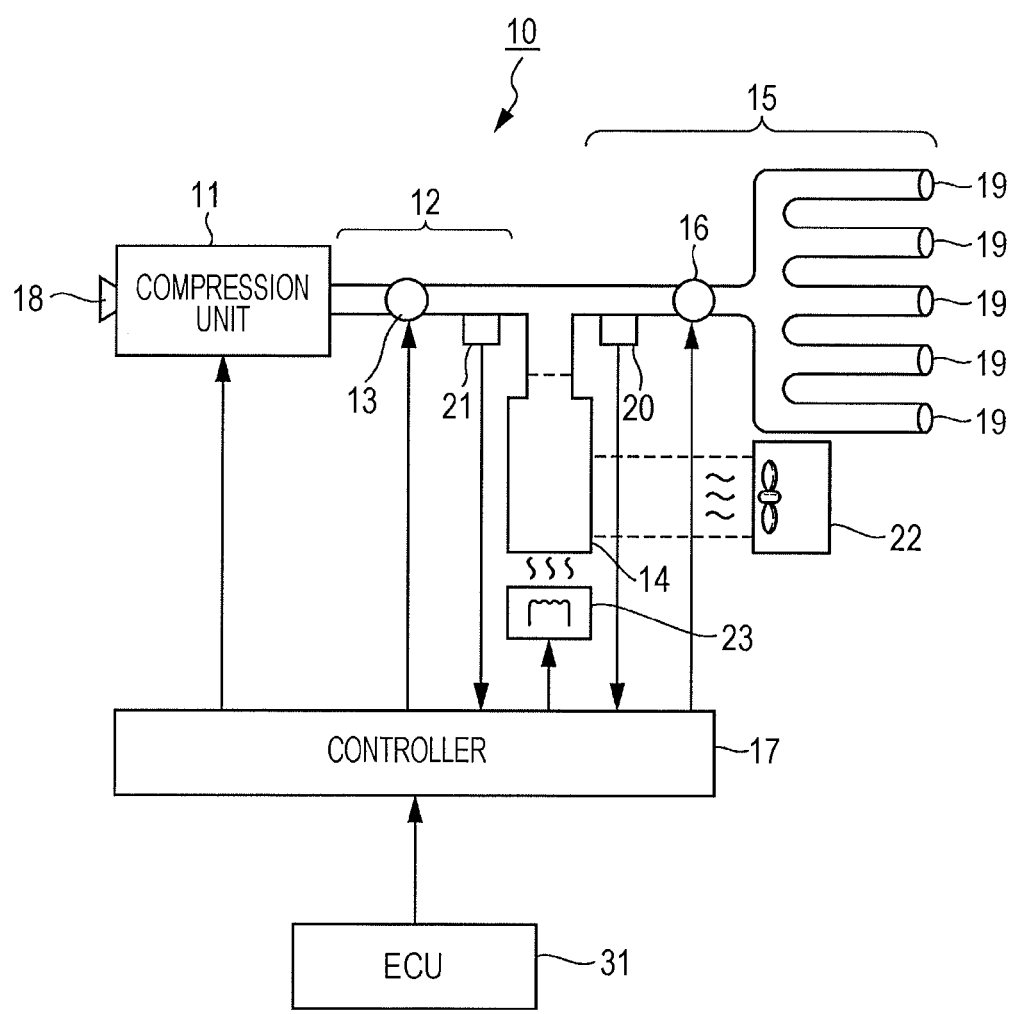
FIG. 2 is a configuration diagram of the air conditioning apparatus to be mounted on the automobile in FIG. 1.

FIG. 2 is a configuration diagram of the rapid air conditioning apparatus 10 to be mounted on the automobile 1 in FIG. 1. With the rapid air conditioning apparatus 10 in FIG. 2, the passenger space 3 is cooled by releasing the compressed air into the passenger space 3 in FIG. 1.

The rapid air conditioning apparatus 10 includes a compression unit 11, an air intake duct 12, an air intake valve 13, a tank 14, a discharge air duct 15, a discharge valve 16, a controller 17, a cooling unit 22, and a heating unit 23. The rapid air conditioning apparatus 10 includes a pressure sensor 20 to detect pressure of the compressed air in the tank 14, and a temperature sensor 21 to detect temperature of the compressed air in the tank 14.

The compression unit 11 has a compressor, with activation and stopping being controlled by the controller 17, and the air is suctioned, compressed, and output during activation thereof. The controller 17 may control the capabilities of the compression unit 11 being activated.

The intake vent 18 of the compression unit 11 may be provided to the passenger space 3 or may be provided out of the automobile 1 (out of the passenger space 3). In the event of suctioning the external air out of the passenger space 3, the compression unit 11 may adjust suctioning capacity according to running speed, or may suction the external air while parked. Fluctuation of the atmospheric pressure of the external air suppresses excessive load from affecting the compression unit 11. In the event of suctioning the inner air within the passenger space 3, the atmospheric pressure of the passenger space 3 decreases. Therefore, for example, in a state in which the air conditioning apparatus mounted on the automobile 1 is set to the external air introduction mode, the compression unit 11 may suction the inner air. The inner air is commonly adjusted with temperature and moisture by the air conditioning apparatus. The inner air suppresses, as compared to the external air, moisture in the air stored in the tank 14, cooling effects after re-releasing this air into the passenger space 3, and suppression effects of moisture increase can be expected.

The compression unit 11 may use the rotational driving force of the engine 7 mounted on the vehicle 2 as a power source, but in the present embodiment, energy that is generated without putting a workload on the driving power source and electric power of the vehicle is used. For example, in a deceleration period when engine braking, for example, the compression unit 11 uses the rotational force transmitted from the wheels to drive the compressor and compress air. Alternatively, air may be compressed using discharge pressure from air brakes, or air may be compressed by a compressor driven by discharge pressure of air brakes.

Accordingly, the compression unit 11 is preferably provided in the engine room, as shown in FIG. 1. In this case, there is provided an electromagnetic clutch between the output shaft of the engine 7 and the input shaft of the compression unit 11. The compression unit 11 can be stopped while the engine 7 is running by disengaging the electromagnetic clutch. Also, by engaging the electromagnetic clutch during deceleration, the compressor can be operated by rotational force transmitted from the wheels during a period of decelerating by engine braking.

Additionally, with the compression unit 11, a battery to be mounted on the vehicle body 2, a generator, the power of the solar light panel, or household power supply may be employed as a source of power, for example. Also, the compressor of the compression unit 11 of the rapid air conditioning apparatus 10 may be integral with a compressor of the air conditioning apparatus mounted on the vehicle.

The air intake duct 12 connects the compression unit 11 and tank 14. The air compressed by the compression unit 11 is supplied to the tank 14 via the air intake duct 12.

The air intake valve 13 is provided to the air intake duct 12. Opening/closing of the air intake valve 13 is controlled by the controller 17. In the event that the air intake valve 13 is in an opened state, the air compressed by the compression unit 11 is supplied to the tank 14. In the event that the air intake valve 13 is in a closed state, the air intake duct 12 is blocked, and supply of the compressed air from the compression unit 11 to the tank 14 is stopped. The compressed air does not flow backward from the tank 14 side to the compression unit 11.

With the tank 14, the compressed air is stored. The tank 14 may be a metal type, for example, such as stainless steel or the like, or may be a product made from reinforced plastic. With the tanks 14 made from these materials, the compressed air can be stored with high pressure. For example, with a vehicle of which the passenger space is 4000 liters in capacity, the compressed air is stored in a 40-liter tank at a pressure of 1470 psi, and a control unit releases the compressed air equivalent to equal to the capacity of the passenger space which is lower in temperature than room temperature, and accordingly, the air of higher room temperature within the passenger space is forced outside of the vehicle, and accordingly, the compressed air which has been cooled by being expanded replaces the air in the passenger space, whereby the room temperature of the passenger space can be decreased. Therefore, though there is no particular restriction regarding the capacity and shape of the tank 14, the capacity of the tank may suitably be equal to or greater than the capacity of the passenger space. Also, instead of the air in the passenger space being switched with the expanded compressed air, high room temperature in the passenger space may be decreased by releasing less compressed air than the capacity of the passenger space into the passenger space. The larger the capacity of the tank 14 is, the large the compressed air can be stored.

The tank 14 may be fixed to the automobile 1 or rapid air conditioning apparatus 10, or may be detachable. In the case that the tank 14 is detachable, the tank 14 can be replaced. The tank 14 in which the compressed air is enclosed beforehand is attached, whereby the compressed air can be released into the passenger space 3 without using the compression unit 11. Enclosing aroma oil or perfume in the tank 14 along with the compressed air allows odor eliminating within the vehicle to be expected.

The installation place of the tank 14 is not particularly restricted. The tank 14 may be installed in a suitable place based on the safety standard or the like needed for the automobile 1 or the like. In FIG. 1, the tank 14 is installed in the engine room. The tank 14 may be installed in cargo space or the passenger space 3. In the event of installing the tank 14 in the passenger space 3, the tank 14 has to be installed in a place where direct sunlight does not hit or a place where the temperature is prevented from increasing.

Note that the rapid air conditioning apparatus 10 may include multiple tanks 14. The multiple tanks 14 may be tanks which independently store the compressed air and independently supply to the passenger space 3, or may be tanks in which the compressed air is supplied from one of the tanks 14 to the other tank 14.

The discharge air duct 15 connects between the tank 14 and passenger space 3. The compressed air discharged from the tank 14 is supplied to the passenger space 3 of the automobile 1 through the discharge air duct 15.

A discharge vent 19 of the discharge air duct 15 is provided to the passenger space 3. The discharge vent 19 may have a nozzle shape. The discharge vent 19 has a nozzle shape, whereby the compressed air can be discharged to the passenger space 3 while maintaining pressure within the discharge air duct 15.

The locations, directions, and number of the discharge vents 19 are not restricted in particular. The discharge vent of the air conditioning apparatus may be used. Also, the discharge vent 19 may be connected to the duct of the air conditioning apparatus. However, the compressed air has not only an advantage of decreasing the temperature by being expanded, but also an advantage of decreasing surface temperature of an object on which the compressed air is sprayed. Therefore, it is desirable to provide the discharge vent 19 in the position and direction where the compressed air can directly be sprayed on a location such as a sheet, handle, dashboard, and so forth where the temperature increases, or a location with which the user directly comes into contact. For example, the discharge vent 19 may be provided downward as to a pillar or roof or the like.

In FIG. 1, a part of the multiple discharge vents 19 are provided downward as to the roof, and are installed so as to spray the compressed air to the seats 4. Also, the rest of the multiple discharge vents 19 are provided upward within the seats 4, and are installed so as to spray the compressed air from the seats 4 to the passenger space 3.

A discharge valve 16 is provided to the discharge air duct 15. Opening/closing of the discharge valve 16 is controlled by the controller 17. In the event that the discharge valve 16 is in a closed state, the discharge air duct 15 is blocked, and the compressed air within the tank 14 is pooled and stored within the tank 14. The discharge valve 16 is closed under the operation of the compression unit 11, and accordingly, the air pressure within the tank 14 increases. In the event that the discharge valve 16 is in an opened state, the compressed air stored in the tank 14 is released into the passenger space 3.

The controller 17 is connected to the units of the rapid air conditioning apparatus 10, such as the compression unit 11, air intake valve 13, discharge valve 16, pressure sensor 20, cooling unit 22, heating unit 23, and so forth. The controller 17 controls the rapid air conditioning apparatus 10.

The rapid air conditioning apparatus 10 compresses the air at the compression unit 11, stores the compressed air in the tank 14, and releases the compressed air stored in the tank 14 into the passenger space 3. The compressed air released from the passenger space 3 is expanded at the passenger space 3, and according to an endothermic effect at the time of this distension, the air within the passenger space 3 is cooled. Also, a location where the compressed air has been sprayed is cooled.

Note that, with the controller 17, the tank 14 in which the compressed air is stored may be heated by a heater, or may be cooled by a thermistor. Thus, the temperature before releasing of the compressed air is adjusted, and the room temperature of the passenger space 3 after the compressed air is released can be adjusted.

The controller 17 includes memory in which a control program is stored, and a central processing unit which executes the control program. The controller 17 may be an independent controller 17, may be realized as a part of an ECU (Engine Control Unit) which controls the engine 7 of the automobile 1, or may be realized by a controller of the air conditioning apparatus.

In order to obtain various types of information to be used for control processing or determination, a running control signal of the vehicle, and various types of detection signals are input to the controller 17. Examples of such signals include a detection signal of the state of the ignition key, an activation signal or stop signal of the engine 7, a speed pulse signal, a brake operation signal, a remote control open/close key detection signal, and an unlocking signal or locking signal of the door panel 5. These signals are input from an ECU (Electronic Control Unit) 31, for example. Other examples include detection signals such as an external temperature sensor, internal temperature sensor, or a sunshine sensor, for example.

Note that the controller 17 may include a timer to measure point-in-time and time, a wireless communication unit which communicates with a cellular phone or the like, and so forth.

The cooling unit 22 cools compressed air stored in the tank 14. Starting and stopping of the cooling unit 22 is controlled by the controller 17. The cooling unit 22 may be a dedicated unit of the rapid air conditioning apparatus 10, but in the present embodiment, existing facilities of the vehicle are used, and energy that is generated without putting a workload on the driving power source and electric power of the vehicle is used.

Specifically, the cooling unit 22 cools the compressed air stored in the tank 14 with, for example, air taken into the vehicle or cooled, breeze from running, coolant of an air conditioning apparatus, coolant generated using driving force of the engine 7 or transmission of the vehicle, or coolant obtained by electric power of the battery or generator.

The heating unit 23 heats compressed air stored in the tank 14. Starting and stopping of the heating unit 23 is controlled by the controller 17. The heating unit 23 may be a dedicated unit of the rapid air conditioning apparatus 10, but with the present embodiment, existing facilities of the vehicle are used, and energy that is not generated without putting a workload on the driving power source and electric power of the vehicle is used.

Specifically, the heating unit 23 heats the compressed air stored in the tank 14 with, for example, air taken into the vehicle or heated, heat from the vehicle 2, heat carrier of an air conditioning apparatus, heat carrier generated using driving force of the engine 7 or transmission of the vehicle, heat carrier obtained by electric power of the battery or generator, engine heat or exhaust heat, or heat from brakes or the transmission.

Figure 3:
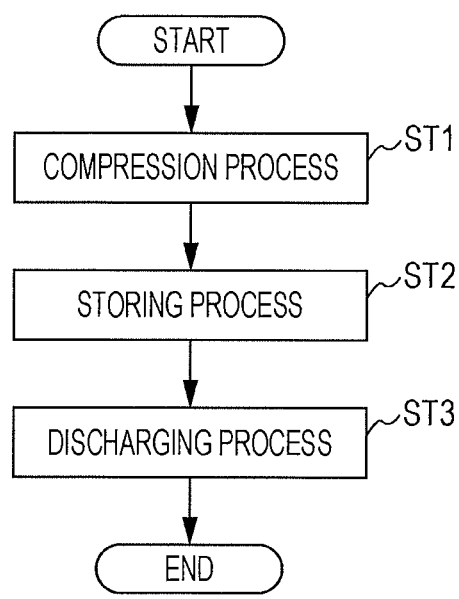
FIG. 3 is a flowchart of a rapid cooling/heating process by a controller in FIG. 2.

Next, the operation of the rapid air conditioning apparatus 10 in FIG. 2 will be described. FIG. 3 is a flowchart illustrating the entirety of a cooling process of the rapid air conditioning apparatus 10 in FIG. 2.

With the overall control in FIG. 3, the controller 17 of the rapid air conditioning apparatus 10 first executes an air compressing process (step ST1).

The controller 17 executes the compressing process during deceleration of the vehicle, for example. With the compressing process, in a state in which the air intake valve 13 is opened, and the discharge valve 16 is closed, the controller 17 operates the compression unit 11 to supply the compressed air to the tank 14. In the case of using the electromagnetic clutch, the controller 17 makes connection thereof.

The controller 17 may determine, based on the detection signal of the pressure sensor 20 which detects the pressure of the tank 14, or a flag indicating the cycle of the rapid air conditioning apparatus 10 stored in memory, whether or not there is the compressed air in the tank 14, and in the event that no compressed air is stored, operate the compression unit 11.

In the event that deceleration ends during compression, the controller 17 closes the air intake valve 13, and disengages the electromagnetic clutch, whereupon compression is interrupted. Upon decelerating again, the controller 17 opens the air intake valve 13 and engages the electromagnetic clutch. The controller 17 repeats this control while the vehicle is being driven, thereby storing compressed air in the tank 14.

Also, in the event that the pressure detected by the pressure sensor 20 has exceeded a reference value, the controller 17 ends the compressing process. Upon the controller 17 having ended the compressing process, the compression unit 11 is stopped, and the air intake valve 13 is closed. In the event of using an electromagnetic clutch, the controller 17 disengages this. Thus, the air intake valve 13 and discharge valve 16 both are in a closed state, and the compressed air having pressure equal to or greater than a reference value is stored in the tank 14 (storing process, cooling process, step ST2). Note that predetermined reference pressure for stopping storage of the compressed air as to the tank 14 has to be higher than the atmospheric pressure, and is several Mpa, for example.

Incidentally, the air generates heat when compressed. The compressed air stored in the tank 14 is cooled along with the tank 14 after completion of compression. For example, in the event that the tank 14 does not have a heat-insulated configuration, temperature of the compressed air is cooled up to the same temperature as the external temperature of the tank 14. Accordingly, with the storing process after the compressed air is supplied to this tank 14, the temperature of the passenger space within the tank 14 is cooled to normal temperature, for example.

Note however, with the present embodiment, in the storing process, the controller 17 either heats or cools the compressed air stored in the tank 14. For example, the controller 17 calculates the amount of heat necessary for the compressed air stored in the tank 14, such that the temperature within the passenger space 3 as a result of the compressed air in the tank 14 being discharged to the passenger space 3 will be the temperature set at the air conditioning apparatus. The controller 17 executes control such that the heat amount of the compressed air stored in the tank 14 is this necessary amount of heat.

In the event that the amount of heat of the compressed air stored in the tank 14 is insufficient, the controller 17 activates the heating unit 23. The heating unit 23 heats the compressed air of the tank 14 using, for example, heat from the hot engine 7, heat from the heater of the air conditioning apparatus, or the like. Upon the temperature of the compressed air detected by the temperature sensor 21 reaching the desired temperature, the controller 17 stops the heating unit 23.

In the event that the amount of heat of the compressed air stored in the tank 14 is excessive, the controller 17 activates the cooling unit 22. The cooling unit 22 cools the compressed air of the tank 14 using, for example, air taken into the vehicle, coolant or cooled air of the air conditioning apparatus, or the like. Upon the temperature of the compressed air detected by the temperature sensor 21 reaching the desired temperature, the controller 17 stops the cooling unit 22.

Next, the controller 17 executes a releasing process (step ST3).

The controller 17 executes the releasing process, for example, when the user gets into the vehicle, after the user gets into the vehicle, or in the event that determination is made that the user is likely to get into the vehicle, based on information from the passenger detector.

With the releasing process, the controller 17 opens the discharge valve 16 while keeping the air intake valve 13 closed. Thus, the compressed air stored in the tank 14 is discharged to the passenger space 3 through a discharge nozzle. The compressed air is expanded within the passenger space 3, and the room temperature in the boarding case 3 is decreased by endothermic reaction accompanying expansion.

Note that, with this releasing process, in order to suppress pressure increase in the passenger space 3, the controller 17 may execute control to open the window glass 6 together, or may control the air conditioning apparatus in accordance with the external air introduction mode. The controller 17 has to start releasing of the compressed air in a state in which a vent hole is provided to the passenger space 3 in this way. The controller 17 may detect that the window glass 6 or door panel 5 is opened to start releasing of the compressed air.

As described above, in order to release the compressed air into the passenger space 3, the controller 17 executes the compressing process, storing process, and releasing process as one-time cooling cycle. Thus, the room temperature of the passenger space 3 after releasing decreases as compared to before releasing.

The rapid air conditioning apparatus 10 can cool the passenger space 3. The controller 17 can repeatedly execute the cooling cycle, and thus the passenger space 3 can be cooled over multiple times.

Also, with the rapid air conditioning apparatus 10 according to the present embodiment, instead of releasing into the passenger space 3 immediately after compressing the air, the compressed air passes through the storing process. According to passing through a cooling period in this storing process, the temperature in the compressed air decreases as compared to the temperature at the time of completion of compression, and becomes normal temperature, for example.

The compressed air of which the temperature has been lowered is released into the passenger space 3, whereby more room temperature lowering can be expected as compared to a case where the high-temperature compressed air immediately after compression is released.

In the compressing process of this cooling cycle, the controller 17 uses energy that is generated without putting a workload on the power source or electric power of the vehicle to compress air, by rotational driving force transmitted from the wheels during a period of decelerating by engine braking. In the event of heating in the storing process, the controller 17 heats the compressed air stored in the tank 14 using energy that is generated without putting a workload on the power source or electric power of the vehicle, such as heat dissipation from the engine 7, for example. In the event of cooling in the storing process, the controller 17 cools the compressed air stored in the tank 14 using energy that is generated without putting a workload on the power source or electric power of the vehicle, such as coolant of the air conditioning apparatus, for example.

Thus, the rapid air conditioning apparatus 10 according to the present embodiment uses energy that is generated without putting a workload on the power source or electric power of the vehicle to compress, heat, and cool the air. Accordingly, the rapid air conditioning apparatus 10 can compress, heat, and cool the air using low-load energy, dissipated heat energy, and excessive energy.

Second Embodiment

The first embodiment is an example of the basic configuration and operation of the rapid air conditioning apparatus 10 which cools the passenger space 3 using the compressed air. A second embodiment is a more specific example of the rapid air conditioning apparatus 10. The basic configurations of the vehicle and rapid air conditioning apparatus 10 according to the second embodiment are the same as with those of the first embodiment.

Figure 4:
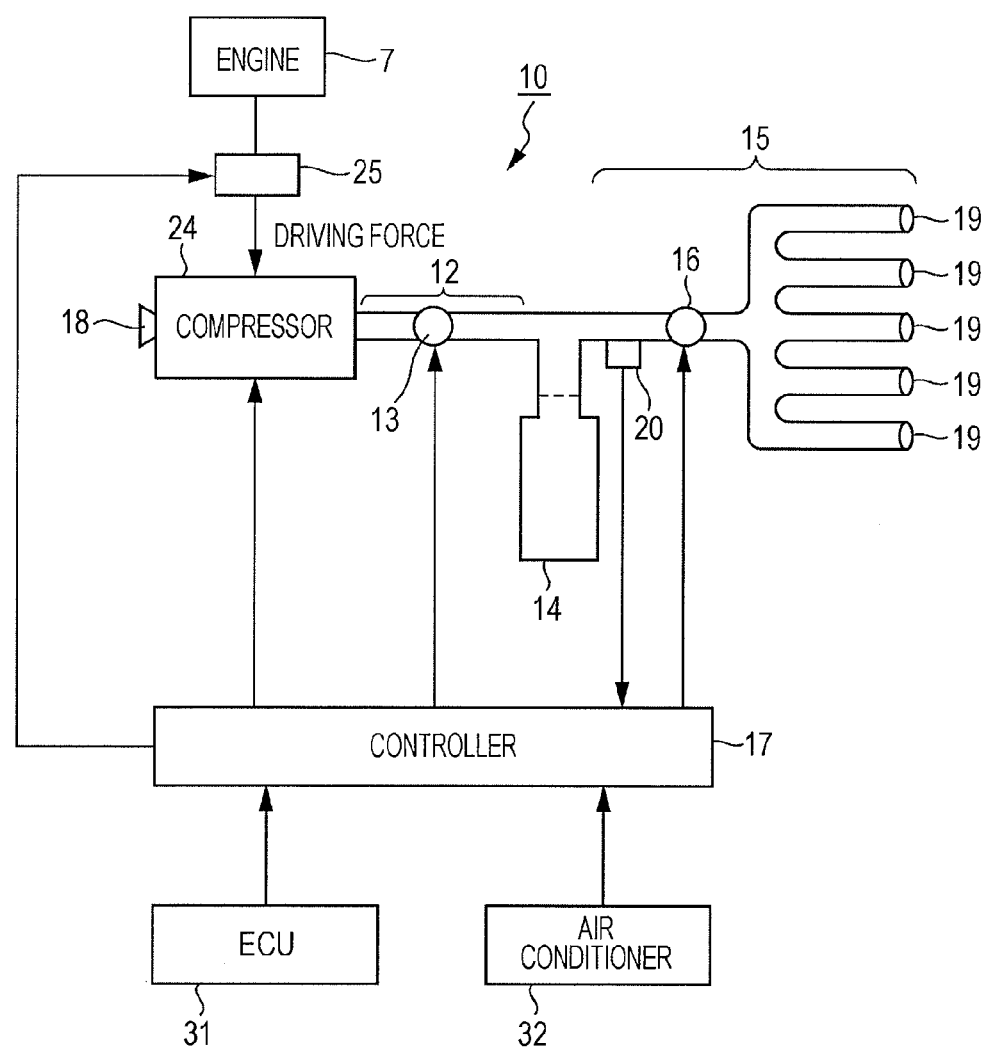
FIG. 4 is a configuration diagram of a compression system portion of the air conditioning apparatus according to a second embodiment of the present invention.

FIG. 4 is a configuration diagram of the compression system part of the rapid air conditioning apparatus 10 according to the second embodiment of the present invention. The rapid air conditioning apparatus 10 in FIG. 4 has a compressor 24 and an electromagnetic clutch 25 as the compression unit 11 to compress air in the tank 14.

For the compressor 24, a positive displacement pump, for example, may be used. A positive displacement pump compresses fluid by performing an operation in which fluid such as air is suctioned from an intake vent 18, and the capacity of the suctioned fluid is reduced. Examples of the positive displacement pump include a gear pump, a diaphragm pump, a piston pump, and a plunger pump. The gear pump compresses fluid by rotation. The diaphragm pump, piston pump, and plunger pump compress fluid by reciprocation.

The rapid air conditioning apparatus 10 according to the present embodiment directly releases the compressed air into the passenger space 3. In order to suppress contamination of the passenger space 3, it is desirable to employ an oil-less type as for the compressor 24. The compressed air in the rapid air conditioning apparatus 10 may perform thermal exchange of the coolness of the compressed air into with other air, such as external air, by heat-exchange equipment, and supply this to the passenger space 3, rather than releasing the compressed air into the passenger space 3 as it is.

The electromagnetic clutch 25 is provided between the output shaft of the engine 7 and the input shaft of the compressor 24. The compressor 24 can be stopped while the engine 7 is running by disengaging the electromagnetic clutch 25. Also, by engaging the electromagnetic clutch 25 during deceleration, the compressor 24 can be operated by rotational force transmitted from the wheels during a period of decelerating by engine braking. The compressor 24 and electromagnetic clutch 25 are preferably provided in the engine room.

Figure 5:
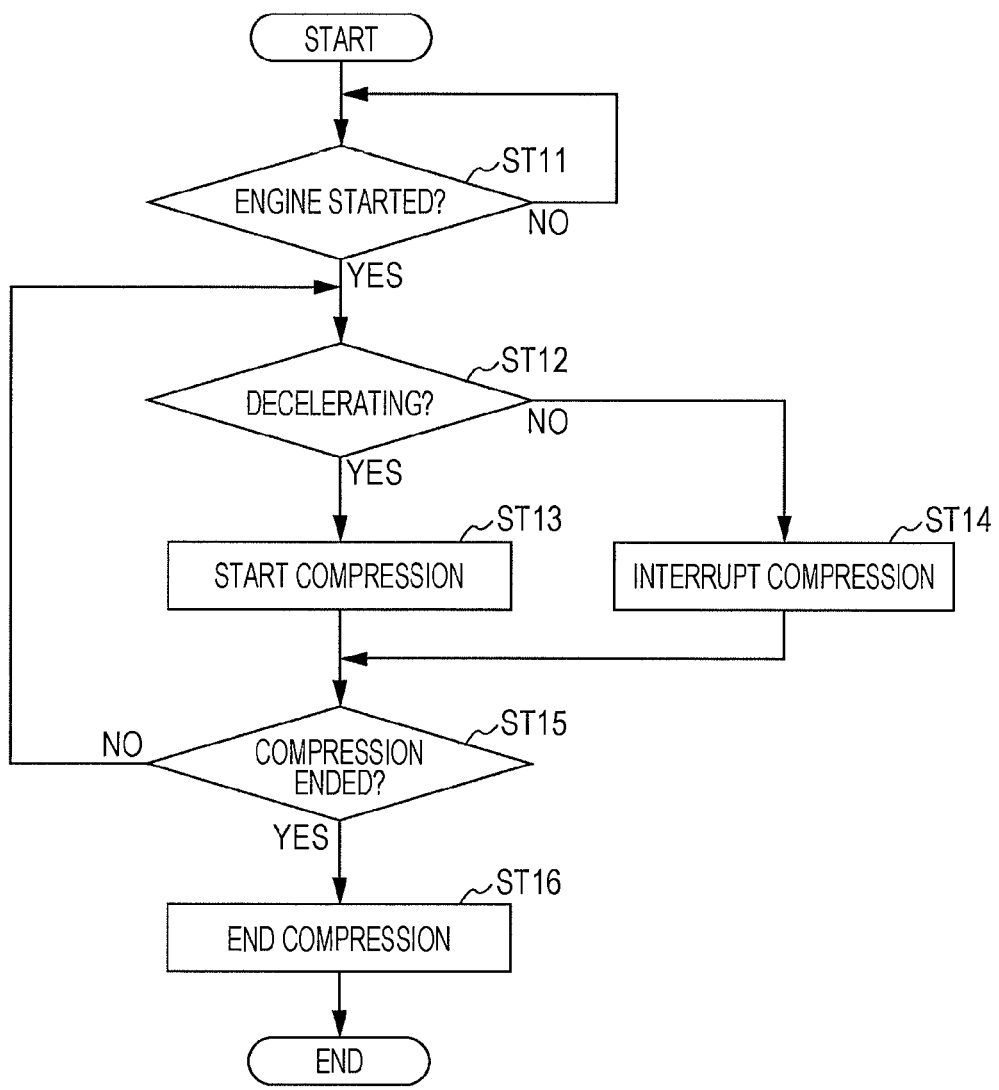
FIG. 5 is a flowchart of a compressing process of the air conditioning apparatus of the air conditioning apparatus in FIG. 4.

FIG. 5 is a flowchart of the compressing process of the rapid air conditioning apparatus 10 in FIG. 4. Upon the engine 7 being started in step ST11, the controller 17 determines whether or not the vehicle is decelerating (step ST12). The controller 17 can determine starting of the engine 7 by a start signal from the ECU 31, for example. The controller 17 can detect whether or not the vehicle is decelerating, by a vehicle speed pulse signal from the ECU 31 and a detection signal indicating that the accelerator pedal is not being depressed, for example. Upon a state in which accelerator pedal is not being depressed is detected while the vehicle speed pulse signal is being detected, the vehicle can be considered to be in a state of decelerating while engine braking.

In the event that the vehicle is decelerating, the controller 17 starts the compressing process (step ST13). The controller 17 engages the electromagnetic clutch 25 and activates the compressor 24. The controller 17 also opens the air intake valve 13. Thus, air is compressed in the tank 14.

Thereafter, the controller 17 repeats the determination in step ST12 regarding whether or not the vehicle is decelerating. If no longer decelerating, the controller 17 interrupts the compression (step ST14). The controller 17 closes the air intake valve 13, disengages the electromagnetic clutch 25, and stops the compressor 24. Thus, compression of air to the tank 14 is interrupted.

The controller 17 determines whether or not to end the compressing process (step ST15). Upon the detection pressure of the pressure sensor 20 having exceeded a predetermined pressure, for example, the controller 17 determines to end the compressing process. If the detection pressure has not exceeded the predetermined pressure, the controller 17 repeats the processing of steps ST12 through ST14. Accordingly, intermittently, air is compressed and the compressed air is stored in the tank 14, while the vehicle is decelerating.

In the event ending the compressing process, the controller 17 closes the air intake valve 13. The controller 17 disengages the electromagnetic clutch 25, and stops the compressor 24 (step ST16). Thus, compression of air to the tank 14 ends. Compressed air of a predetermined constant pressure is stored in the tank 14.

Figure 6:
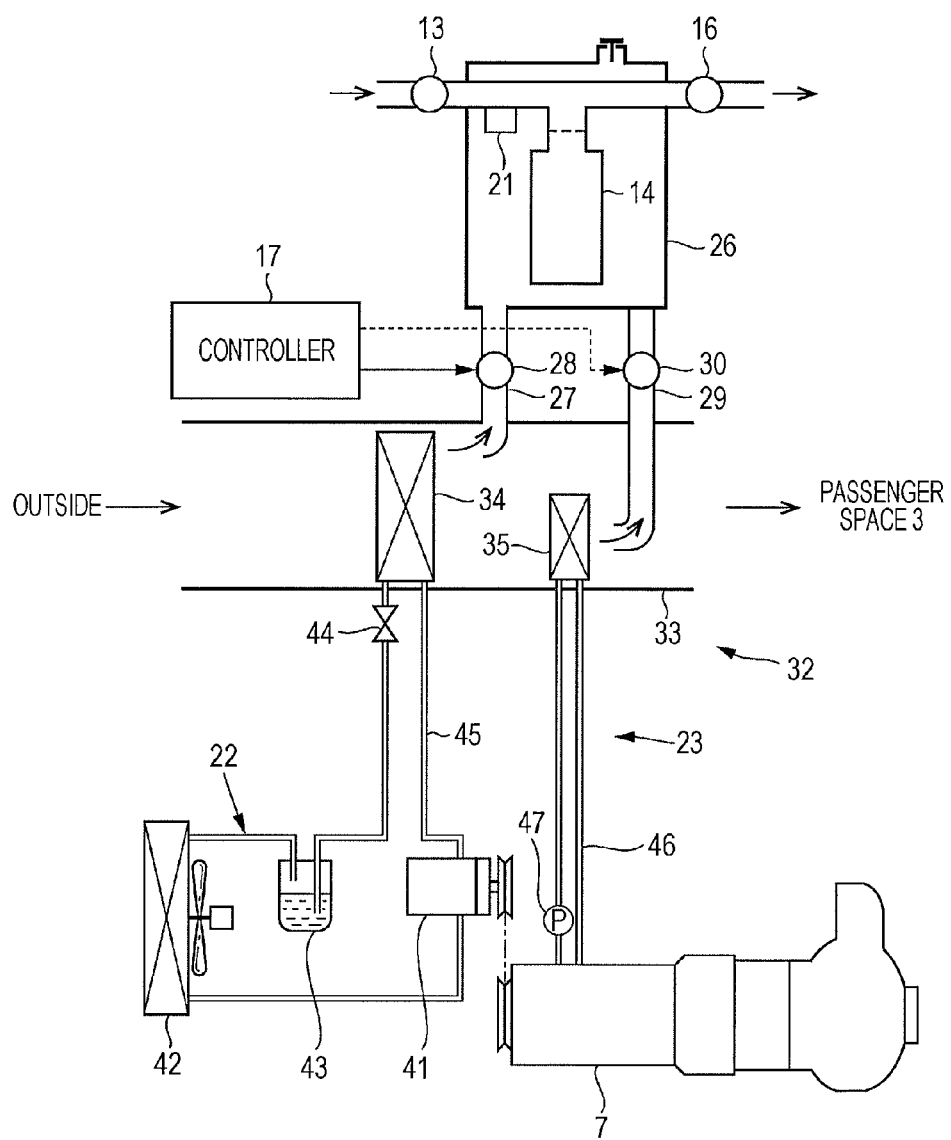
FIG. 6 is a configuration diagram of a heating/cooling system portion of the air conditioning apparatus in FIG. 4.

FIG. 6 is a configuration diagram of the heating/cooling system part of the rapid air conditioning apparatus 10 in FIG. 4. The rapid air conditioning apparatus 10 in FIG. 6 heats or cools the compressed air stored in the tank 14 with air cooled or heated by an air conditioning apparatus 32. The rapid air conditioning apparatus 10 has an insulating case 26 having a vent, and a cool air duct 27, cool air vent 28, warm air duct 29, and warm air valve 30 which communicate with the insulating case 26.

The insulating case 26 stores a duct from the air intake valve 13 to the discharge valve 16, and the tank 14. It is sufficient for the insulating case 26 to insulate between the inside and outside of the case, by a vacuum layer for example.

The cool air duct 27 guides cool air into the insulating case 26. The cool air duct 27 connects the insulating case 26 with the air conditioning duct 33 of the air conditioning apparatus 32. The cool air duct 27 is also connected to a portion of the air conditioning duct 33 of the air conditioning apparatus 32 that is downstream from an evaporator 34. Accordingly, air which is suctioned into the vehicle by the air conditioning apparatus 32 and further cooled by the evaporator 34 is introduced to the insulating case 26 via the cool air duct 27.

The evaporator 34 is a part of the cooling unit 22. The cooling unit 22 has a compressor 41 which is driven by the engine 7, a condenser 42 which condenses and liquefies compressed coolant, a receiver 43 which separates just cooling medium from the condensed and liquefied coolant, an expansion valve 44 which performs decompression and expansion of the cooling medium, the evaporator 34 which performs gasification of the expanded coolant, and piping 45 which connects these in a ring.

The cool air valve 28 is provided to the cool air duct 27. The cool air valve 28 is opened and closed by the controller 17. When the cool air valve 28 is in an open state, cool air from the air conditioning apparatus 32 is supplied to the insulating case 26. When the cool air valve 28 is in a closed state, cool air introduced to the insulating case 26 stands therein. The compressed air within the tank 14 is cooled by this cool air.

The warm air duct 29 guides warm air into the insulating case 26. The warm air duct 29 connects the insulating case 26 with the air conditioning duct 33 of the air conditioning apparatus 32. The warm air duct 29 is also connected to a portion of the air conditioning duct 33 of the air conditioning apparatus 32 that is downstream from a heater 35. Accordingly, air which is suctioned into the vehicle by the air conditioning apparatus 32 and further heated by the heater 35 is introduced to the insulating case 26 via the warm air duct 29.

The heater 35 is a part of the heating unit 23. The heating unit 23 has the heater 35, piping 46 to circulate cooling water heated by the engine 7 to the heater 35, and a cooling water pump 47 provided to the piping 46.

The warm air valve 30 is provided to the warm air duct 29. The warm air valve 30 is opened and closed by the controller 17. When the warm air valve 30 is in an open state, warm air from the air conditioning apparatus 32 is supplied to the insulating case 26. When the warm air valve 30 is in a closed state, warm air introduced to the insulating case 26 stands therein. The compressed air within the tank 14 is heated by this warm air.

Figure 7:
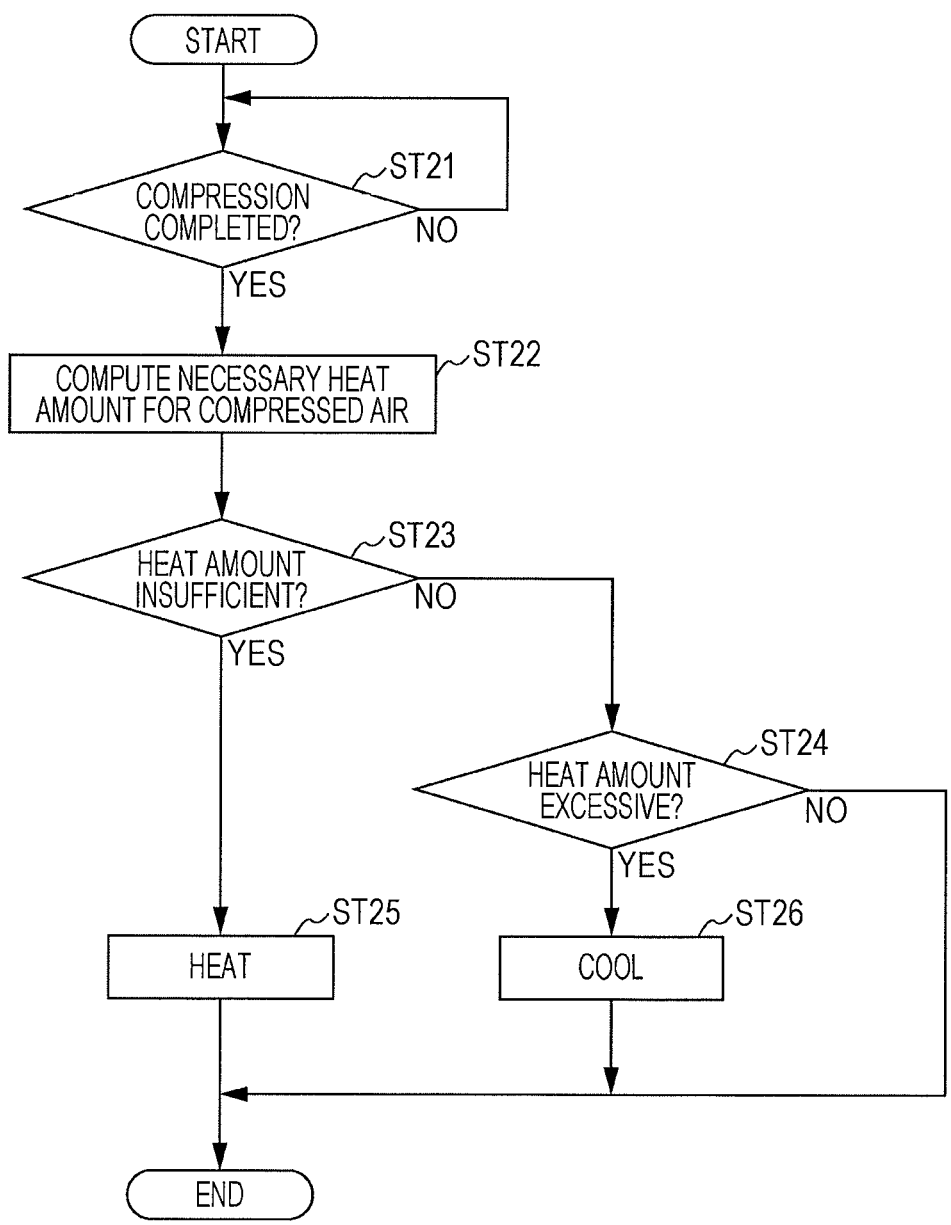
FIG. 7 is a flowchart of a storing process of the air conditioning apparatus in FIG. 6.

Next, description will be made regarding cooling or heating in the storing process of the rapid air conditioning apparatus 10 in FIG. 6. FIG. 7 is a flowchart of the storing process of the rapid air conditioning apparatus 10 in FIG. 6. Upon the compressing process ending, the controller 17 of the rapid air conditioning apparatus 10 starts the storing process (step ST21).

Upon starting the storing process, the controller 17 computes the amount of necessary heat for the compressed air (step ST22). For example, the controller 17 calculates the amount of necessary heat for the compressed air stored in the tank 14, such that the temperature of the passenger space 3 becomes the temperature set at the air conditioning apparatus 32 by discharging the compressed air stored in the tank 14 to the passenger space 3. Alternatively, the controller 17 may compute the amount of heat necessary to cool to a certain temperature in accordance with the season, such as to 28° C. during summer, for example.

After computing the necessary heat amount, the controller 17 determines whether there is excessive or insufficient heat amount of the compressed air actually stored in the tank 14 (steps ST23 and ST24). The controller 17 computes the heat amount of the compressed air actually stored in the tank 14, based on the temperature detected by the temperature sensor 21 and the pressure at the pressure sensor 20, and compares this with the necessary heat amount calculated earlier.

In the event that the amount of heat is insufficient, the controller 17 executes heating processing of the compressed air (step ST25). The controller 17 operates the cooling water pump 47 of the heating unit 23. the cooling water pump 47 may be controlled by the air conditioning apparatus 32 under command of the controller 17. Also, upon the heater 35 being heated, the controller 17 opens the warm air valve 30. Accordingly, air taken in by the air conditioning apparatus 32, and heated by the heater 35, is introduced into the insulating case 26 via the warm air duct 29. Thus, the compressed air stored in the tank 14 is heated by the warm air introduced into the insulating case 26.

In the event that the amount of heat is excessive, the controller 17 executes cooling processing of the compressed air (step ST26). The controller 17 operates the compressor 41 of the cooling unit 22. The compressor 41 may be controlled by the air conditioning apparatus 32 under command of the controller 17. Also, upon the evaporator 34 being cooled, the controller 17 opens the cool air valve 28. Accordingly, air taken in by the air conditioning apparatus 32, and cooled by the evaporator 34, is introduced into the insulating case 26 via the cool air duct 27. Thus, the compressed air stored in the tank 14 is cooled by the cool air introduced into the insulating case 26.

In the event that the amount of heat is neither excessive nor insufficient, the controller 17 ends the storing processing without performing any heating/cooling.

As described above, the rapid air conditioning apparatus 10 according to the present embodiment compresses air using the braking force of engine braking when decelerating. Also, the rapid air conditioning apparatus 10 uses the cool air of the evaporator 34 of the air conditioning apparatus 32 to cool the compressed air stored in the tank 14, and uses warm air of the heater 35 to warm the compressed air stored in the tank 14. Accordingly, the rapid air conditioning apparatus 10 according to the present embodiment compresses, heats, and cools air using energy that is generated without putting a workload on the power source or electric power of the vehicle. Accordingly, the rapid air conditioning apparatus 10 can compress, heat, and cool the air using low-load energy, dissipated heat energy, and excessive energy.

Note that the heating processing (step ST25) and cooling processing (step ST26) in FIG. 7 may be executed after the passenger space 3 is controlled to a suitable temperature by the air conditioning apparatus 32. Accordingly, the compressed air can be heated/cooled using excess capacity of the air conditioning apparatus 32, and not putting a workload thereupon.

The above embodiments are examples of preferred embodiments of the present invention, but the present invention is in no way restricted to these; rather, various modifications may be made without departing from the spirit and scope of the invention.

With the second embodiment described above, the compressor 24 is driven by rotational force transmitted from the wheels during deceleration which the vehicle is engine braking, and thus compressing air. Alternatively, air may be compressed using the exhaust pressure of air brakes, for example.

Figure 8:
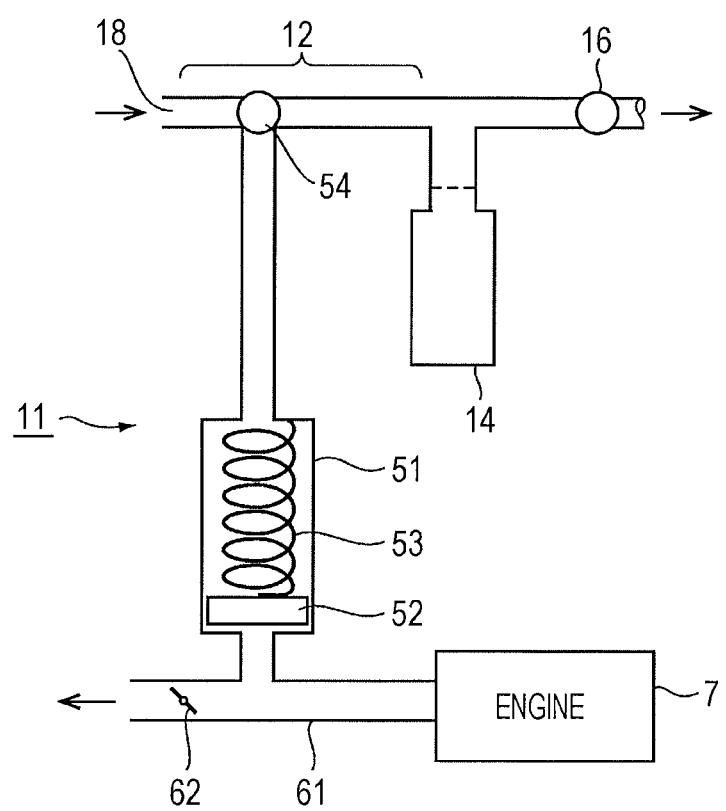
FIG. 8 is a configuration diagram of a modification of the compression system portion of an air conditioning apparatus according to the second embodiment of the present invention.

FIG. 8 is a configuration diagram of a modification of the compression system part of the rapid air conditioning apparatus 10 according to the second embodiment of the present invention. The compression unit 11 of the rapid air conditioning apparatus 10 in FIG. 8 includes a cylinder 51, a piston 52, a spring 53, and a three-way valve 54.

The cylinder 51 communicates with partway of an exhaust pipe 61 with the engine 7 at one side thereof, and with the air intake duct 12 at the other end thereof. The cylinder 51 is connected to the exhaust pipe 61 at a position closer to the engine 7 than a valve 62 for the air brakes.

The piston 52 is positioned in the cylinder 51 so as to be movable from one side to the other side. The piston 52 separates the interior space of the cylinder 51 into one side and the other side. The spring 53 acts to press the piston 52 toward the one side of the cylinder 51.

The three-way valve 54 is provided at a position where the cylinder 51 connects to the air intake duct 12. The three-way valve 54 switches and connects one of the intake vent 18 and tank 14 to the cylinder 51. The three-way valve 54 is controlled by the controller 17.

In the event that no compression is to be performed, the three-way valve 54 connects the intake vent 18 to the cylinder 51. External air is introduced into the cylinder 51 from the intake vent 18.

In the event of performing compression, the controller 17 switches the three-way valve 54 so as to connect the tank 14 to the cylinder 51. The air brakes operate in this state. The valve 62 of the air brakes is closed in this state, and the pressure of the exhaust pipe 61 rises. The pressure of the exhaust pipe 61 moves the piston 52 against the force of the spring 53. The external air in the cylinder 51 is compressed and supplied to the tank 14, so that air is compressed while the air brakes are operating.

While the air brakes are operating, the controller 17 controls the three-way valve 54. The three-way valve 54 closes off the path connecting between the tank 14 and cylinder 51, and opens the path connecting between the cylinder 51 and the intake vent 18. Compressed air is stored in the tank 14.

Disengaging the air brakes lowers internal pressure within the cylinder 51. The pressing force of the spring 53 disposed within the cylinder 51 presses the piston 52 back to its original position. The exhaust gas within the cylinder 51 is forced back into the exhaust pipe 61.

With the above embodiments, the rapid air conditioning apparatus 10 are mounted on the automobile 1, respectively. In addition to these, for example, the rapid air conditioning apparatus 10 may be mounted on other vehicles such as a bus, train, or the like.

The rapid air conditioning apparatus 10 may be formed as independent apparatuses separately from the vehicle.

Electric motors are employed as driving sources of the compressor 11, whereby the rapid air conditioning apparatus 10 can carry out the compressing process without taking the driving source of the engine 7 as a source of power. The rapid air conditioning apparatus 10 employing the electric compressor can be operated by any one of the power of a battery of the vehicle, a solar power-generating panel, and a household power source.

The rapid air conditioning apparatus 10 is configured so as to be portable, and accordingly can be used for cooling of multiple vehicles, and can be used as rapid air conditioning apparatus 10 for emergency use.

With the above embodiments, the rapid air conditioning apparatus 10 includes the compressor 11 in addition to the tank 14. In addition to these, for example, an arrangement may be made where the rapid air conditioning apparatus 10 do not include the compressor 11, by the tank 14 being configured so as to be replaceable. In this case, the rapid air conditioning apparatus 10 does not carry out the compressing process. Also, the rapid air conditioning apparatus 10 carry out the cooling process by confirming residual pressure of the tank 14, or confirming whether or not a new tank 14 has been mounted. In the event of purchasing and using the tank 14, the tank 14 thereof has usually cooled to normal temperature, and accordingly, the storing process for cooling is not needed.

With the above embodiments, the passenger space 3 of a vehicle such as the automobile 1 is cooled by the rapid air conditioning apparatus 10. In addition to this, for example, the passenger space 3 of a vehicle such as the automobile 1 may be cooled by the rapid air conditioning apparatus 10, and the air conditioning apparatus. For example, after the passenger space 3 is initially cooled at the rapid air conditioning apparatus 10, the passenger space 3 may be cooled to a predetermined temperature by the air conditioning apparatus. Thus, the passenger space 3 is cooled in short time in a sure manner as compared to a case where the passenger space 3 is cooled by the air conditioning apparatus alone.

Note that such cooperative cooling operation between the rapid air conditioning apparatus 10 and the air conditioning apparatus can be realized, in the case that these have a separate controller, by transmitting an activation signal from the rapid air conditioning apparatus 10 to the air conditioning apparatus, for example. With an arrangement where the controller is shared, such cooperative cooling operation between the rapid air conditioning apparatus 10 and the air conditioning apparatus can be realized by program-to-program communication according to a flag or the like from the control program in the rapid air conditioning apparatus 10 to the control program in the air conditioning apparatus.

What is claimed is:

1. An air conditioning apparatus comprising:
a tank to store compressed air; and
a control unit configured to release the compressed air stored in the tank and to determine a heat amount of air stored in the tank, wherein
the air conditioning apparatus is configured to use at least one of: energy that is sourced from other than a vehicle power source, energy that is a by-product of a separate process, and energy that is excessive from a separate process, for at least processes of:
compressing air in the tank,
cooling compressed air that is stored in the tank, when the controller determines that a heat amount of the air stored in the tank is above a predetermined heat amount, and
heating compressed air that is stored in the tank, when the controller determines that a heat amount of the air stored in the tank is below a predetermined heat amount.

2. The air conditioning apparatus according to claim 1, wherein compressed air stored in the tank is compressed by one of:
rotational force transmitted from wheels during a deceleration period of the vehicle,
discharge pressure of air brakes, and
a compression device operated by air brakes.

3. The air conditioning apparatus according to claim 2, wherein compressed air that is stored in the tank is cooled by one of:
air taken into the vehicle,
air that is cooled by an air conditioning apparatus,
breeze from running,
coolant of the air conditioning apparatus,
coolant generated using driving force of at least one of an engine and a transmission of the vehicle, and
coolant obtained by electric power from at least one of a battery and generator.

4. The air conditioning apparatus according to claim 2, wherein compressed air that is stored in the tank is heated by one of:
air taken into the vehicle,
air that is heated by an air conditioning apparatus,
heat from the vehicle body,
a heat carrier of the air conditioning apparatus,
a heat carrier generated using driving force of at least one of an engine and a transmission of the vehicle,
a heat carrier obtained by electric power of at least one of a battery and generator,
at least one of engine heat and exhaust heat, and
heat from at least one of brakes and the transmission.

5. The air conditioning apparatus according to claim 3, wherein compressed air that is stored in the tank is heated by one of:
air taken into the vehicle,
air that is cooled by an air conditioning apparatus,
heat from the vehicle body,
a heat carrier of the air conditioning apparatus,
a heat carrier generated using driving force of at least one of an engine and a transmission of the vehicle,
a heat carrier obtained by electric power of at least one of a battery and generator,
at least one of engine heat and exhaust heat, and
heat from at least one of brakes and the transmission.

6. The air conditioning apparatus according to claim 1, wherein compressed air that is stored in the tank is cooled by one of:
air taken into the vehicle,
air that is cooled by an air conditioning apparatus,
breeze from running,
coolant of the air conditioning apparatus,
coolant generated using driving force of at least one of an engine and a transmission of the vehicle, and
coolant obtained by electric power of at least one of a battery and generator.

7. The air conditioning apparatus according to claim 6, wherein compressed air that is stored in the tank is heated by one of:
air taken into the vehicle,
air that is heated by an air conditioning apparatus,
heat from the vehicle body,
a heat carrier of the air conditioning apparatus,
a heat carrier generated using driving force of at least one of an engine and a transmission of the vehicle,
a heat carrier obtained by electric power of at least one of a battery and generator,
at least one of engine heat and exhaust heat, and
heat from at least one of brakes and the transmission.

8. The air conditioning apparatus according to claim 1, wherein compressed air that is stored in the tank is heated by one of:
air taken into the vehicle,
air that is heated by an air conditioning apparatus,
heat from the vehicle body,
a heat carrier of the air conditioning apparatus,
a heat carrier generated using driving force of at least one of an engine and a transmission of the vehicle,
a heat carrier obtained by electric power of at least one of a battery and generator,
at least one of engine heat and exhaust heat, and
heat from at least one of brakes and the transmission.

9. The air conditioning apparatus according to claim 1, wherein air is compressed in the tank by rotational force transmitted from wheels during a deceleration period of the vehicle,
and wherein, in the event of cooling compressed air that is stored in the tank, the compressed air that is stored in the tank is cooled by air taken into the vehicle or air that is cooled by an air conditioning apparatus,
and wherein, in the event of heating compressed air that is stored in the tank, the compressed air stored in the tank is heated by at least one of engine heat and exhaust heat.

10. The air conditioning apparatus according to claim 1, wherein compressed air stored in the tank is compressed by rotational force transmitted from wheels during a deceleration period of the vehicle.

11. The air conditioning apparatus according to claim 1, wherein compressed air that is stored in the tank is cooled by air taken into the vehicle or air that is cooled by an air conditioning apparatus.

12. The air conditioning apparatus according to claim 1, wherein compressed air that is stored in the tank is heated by air taken into the vehicle or air that is heated by an air conditioning apparatus.

13. An air conditioning method of an air conditioning apparatus for cooling a passenger space of a vehicle that accommodates a user, the method comprising the steps of:
compressing air into a tank using at least one of: energy that is sourced from other than a vehicle power source, energy that is a by-product of a separate process, and energy that is excessive from a separate process;
cooling compressed air that is stored in the tank when a controller determines that a heat amount of the compressed air that is stored in the tank is above a predetermined heat amount, and heating compressed air that is stored in the tank when a controller determines that a heat amount of the compressed air that is stored in the tank is below a predetermined heat amount,
wherein cooling and heating of the compressed air are performed using at least one of: energy that is sourced from other than the vehicle power source, energy that is a by-product of a separate process, and energy that is excessive from a separate process; and discharging compressed air stored in the tank into the passenger space.

* * * * *